United States Patent
Fenkl et al.

(10) Patent No.: US 6,491,482 B1
(45) Date of Patent: Dec. 10, 2002

(54) MILLING METHOD

(75) Inventors: Hartmut Fenkl, Stuttagrt (DE); Martin Probst, Mümliswil (CH); Paul Slepcevic, Nussbaumen (CH)

(73) Assignee: ALSTOM (Switzerland) Ltd, Baden (CH)

( * ) Notice: Subject to any disclaimer, the term of this patent is extended or adjusted under 35 U.S.C. 154(b) by 0 days.

(21) Appl. No.: 09/520,891

(22) Filed: Mar. 7, 2000

(30) Foreign Application Priority Data

Mar. 8, 1999 (EP) .............................. 99810202

(51) Int. Cl.$^7$ .............................. B23C 3/18; B23C 3/04; G05B 19/19
(52) U.S. Cl. ........................... 409/132; 409/80; 409/84; 409/120; 409/167; 409/199; 29/889.7; 700/187; 700/190
(58) Field of Search ................................ 409/132, 131, 409/84, 120, 119, 199, 79–80, 166, 167, 165; 29/889, 889.23, 889.6, 889.7, 27 C; 700/190, 187

(56) References Cited

U.S. PATENT DOCUMENTS

| | | | | |
|---|---|---|---|---|
| 2,079,717 A | * | 5/1937 | Roehm et al. | 409/167 |
| 2,826,123 A | * | 3/1958 | Leverington | 409/290 |
| 3,127,506 A | * | 3/1964 | Fayard | 700/187 |
| 3,262,368 A | * | 7/1966 | Attermeyer et al. | 409/167 |
| 3,841,200 A | * | 10/1974 | Berthiez | 409/167 |
| 4,028,992 A | * | 6/1977 | Kuehnle | 409/132 |
| 4,031,809 A | * | 6/1977 | Shraiman et al. | 409/84 |
| 4,176,992 A | * | 12/1979 | Ross et al. | 409/131 |
| 4,460,297 A | * | 7/1984 | Kuehnle | 409/132 |
| 4,521,860 A | * | 6/1985 | Kanematsu et al. | 700/184 |
| 4,747,236 A | * | 5/1988 | Wedeiwski | 409/132 |
| 4,905,158 A | * | 2/1990 | Seki et al. | 700/176 |
| 4,920,838 A | * | 5/1990 | Brandt et al. | 409/131 |
| 4,949,270 A | * | 8/1990 | Shima et al. | 700/187 |
| 5,080,538 A | * | 1/1992 | Schmitt | 409/66 |
| 5,125,775 A | * | 6/1992 | Breuer et al. | 409/132 |
| 5,200,677 A | * | 4/1993 | Dueck et al. | 700/187 |
| 5,368,422 A | * | 11/1994 | Banji | 409/84 |
| 5,378,091 A | * | 1/1995 | Nakamura | 409/132 |
| 5,727,296 A | * | 3/1998 | Kobler | 29/27 C |
| 5,733,080 A | * | 3/1998 | David et al. | 409/132 |
| 6,122,824 A | * | 9/2000 | Jensen | 409/132 |

FOREIGN PATENT DOCUMENTS

| | | | |
|---|---|---|---|
| EP | 0798616 A2 | * | 10/1997 |
| FR | 2 287 962 | | 5/1976 |
| WO | WO 99/32949 | * | 7/1999 |

OTHER PUBLICATIONS

Oberg et al., "Machinery's Handbook, 25$^{th}$ ed.", Industrial Press, Inc., New York, pp. 974–977.*

* cited by examiner

Primary Examiner—A L Wellington
Assistant Examiner—Erica E Cadugan
(74) Attorney, Agent, or Firm—Burns, Doane, Swecker & Mathis, L.L.P.

(57) ABSTRACT

A milling method is provided in which a finished part of any desired contour is milled from a blank of any desired contour by the milling tool being guided on a continuous, spiral guide path from the blank continuously to the finished part. In this case, material is continuously removed during the milling operation without ever lifting the tool or clamping the workpiece in place again. This results in a reduced machining time of the workpiece. The continuous, spiral guide path permits a harmonic change of form from the blank to the finished part with smooth guidance of the tool. The method can also be carried out with ceramic tools.

14 Claims, 4 Drawing Sheets

MILLING METHOD

FIELD OF THE INVENTION

The invention relates to a milling method for producing any desired finished part from any desired blank by a continuous approach from the shape of the blank to the shape of the finished part by continuous material removal, and to a method of producing guide paths for a milling tool used in the milling method. The methods are used in particular in the production of turbine blades.

BACKGROUND OF THE INVENTION

The prior art of milling methods is described here with reference to the production of turbine blades.

Turbine blades of various size are produced, for example, from parallelepiped-shaped blanks. For this purpose, first of all pieces having planar surfaces and corners of the blank are milled off in order to achieve an initial rough polygonal approximation to the blade shape. The milling tool is then guided along a plurality of guide paths or guide-path sections which in each case run along equidistant surfaces. By the milling of a plurality of such equidistant surfaces, the shape of the finished part is achieved in steps. In this case, the guide path is defined by discrete points and/or curve sections.

According to this method a blade is produced slice by slice and with frequent lifting and renewed application of the milling tool. The result of this is that the milling tool moves through the air during a significant period of time and no cutting takes place during this time.

A reduction in the machining time by increasing the milling speed is limited due to the associated decrease in the machining time of the milling tools used.

The use of ceramic tools is not possible in this traditional milling method, since the milling paths often lead there to an unsteady and intermittent progress of the machining process due to frequent lifting and application of the tool. Since it is known that ceramics are very sensitive to fracture and the milling tool often experiences blows along the milling path, it is not suitable for this milling method.

SUMMARY OF THE INVENTION

The object of the invention is to provide a milling method for producing a finished part of any desired contour from any desired blank, which milling method avoids the disadvantages of the method described at the beginning. It is in particular the aim of the invention to reduce the machining time of the workpiece and to use the milling tools in such a way that they are subjected to less wear.

This object is achieved according to the invention by a milling method in which the milling tool is guided along a spiral guide path which runs from a blank of any desired contour continuously down to the desired finished part of any desired contour. Such a spiral guide path can be placed in a workpiece of any shape, irrespective of the contour of the blank and the finished part.

The milling tool is guided along a guide path of this type, as a result of which a milling path is produced which is likewise continuous and basically spiral. The resulting milling path may differ from the guide path covered by inclining the milling tool, whereby however the continuity is retained.

The spiral guide path permits a continuous change in form with continuous material removal from the workpiece, in which case the tool only has to be applied once. The complete milling operation may therefore be effected in a single set-up of the workpiece.

The spiral guide path is distinguished by a smooth and gentle progression which is free of sudden changes of direction. This is the precondition for harmonic guidance of workpiece and tool, this harmonic guidance being free of sudden accelerations and vibrations associated therewith. To this end, the speed of the tool and the workpiece is adapted to the curvature of the guide path.

The main advantage of the method according to the invention lies in the reduction in the machining time of the workpiece and thus in a more cost-effective production. This may be attributed primarily to the continuous material removal. Compared with known methods, the volume of removal per unit of time is greater, since the tool is not directed through the air very often or is not directed through the air at all. The total machining time is further reduced by the workpiece only being clamped in place once. As a result, only one set of clamping positions is required, which further simplifies the method.

A further advantage lies in the smooth tool guidance, as a result of which shocks on the tool are avoided and consequently the use of ceramic tools is made possible. Thanks to their heat resistance, higher milling speeds can be realized, which leads to a further reduction in the milling time.

Furthermore, the continuous material removal and change in form produce the advantage of less distortion of the workpiece.

The milling method according to the invention can be carried out on existing four- or five-axis machine tools. In this case, the number of axes used depends on the complexity of the surface curvature. Whereas simple parts can be milled like clamping positions on four axes, the production of a twisted turbine blade requires milling along five axes.

BRIEF DESCRIPTION OF THE DRAWINGS

FIG. 1a: first auxiliary lines for constructing a spiral, two-dimensional guide path.

FIG. 2a: a guide path consisting of a series of planar, two-dimensional spirals.

DETAILED DESCRIPTION THE PREFERRED EMBODIMENTS

With respect to the milling method according to the invention, first of all an efficient method of producing the guide paths used for this purpose will be described. In the two-dimensional case, the spiral milling path is obtained directly therefrom. In the three-dimensional case, the guide paths produced serve to produce guide surfaces on which a plurality of variants of guide paths can then be produced and milling paths can be realized.

Figure 1:
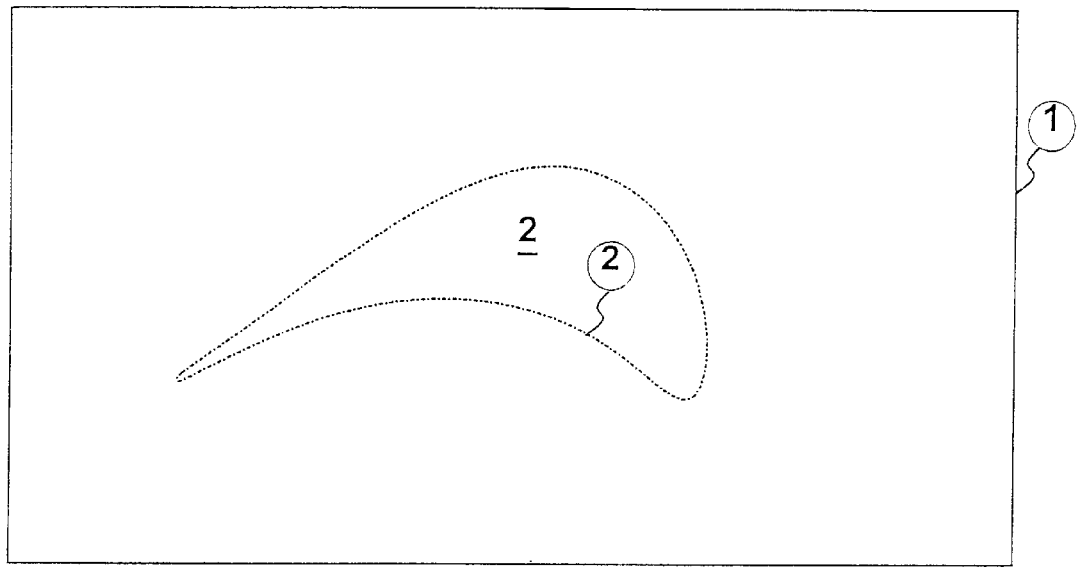
FIG. 1 shows a section of a parallelepiped-shaped blank having a typical profile of a turbine blade.

FIG. 1, in section, shows the contour of a blank 1 and the contour of a finished turbine blade 2 to be obtained.

Figure 1A:
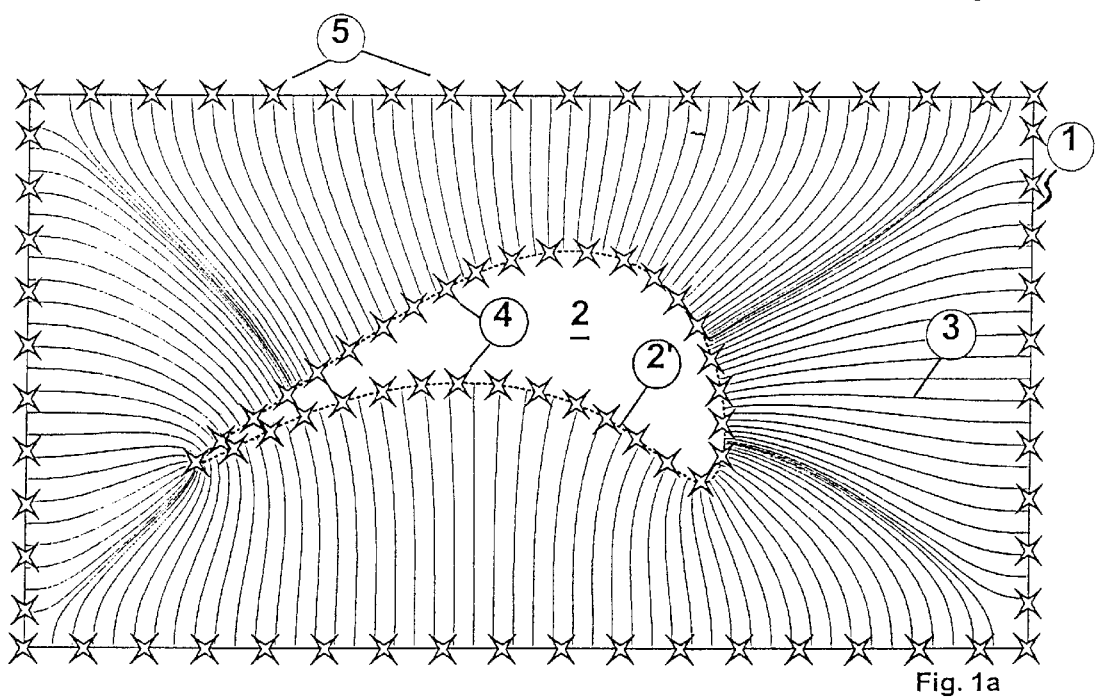
FIGS. 1a, b and c each show a cross section of a blank and a finished turbine blade, of which the following is shown.

FIG. 1a shows the same section through a blank 1 of a workpiece and the finished turbine blade 2 having a profile 2'. To determine a spiral guide path, first of all auxiliary lines 3 are placed between the profile line 2' of the finished part 2 and the profile line of the blank 1. In the embodiment shown, these auxiliary lines 3 run like electrostatic field lines between imaginary electric charges 4 on the profile line of the blade 2 and imaginary electric charges 5 of opposite sign on the profile line of the blank 1.

Figure 1B:
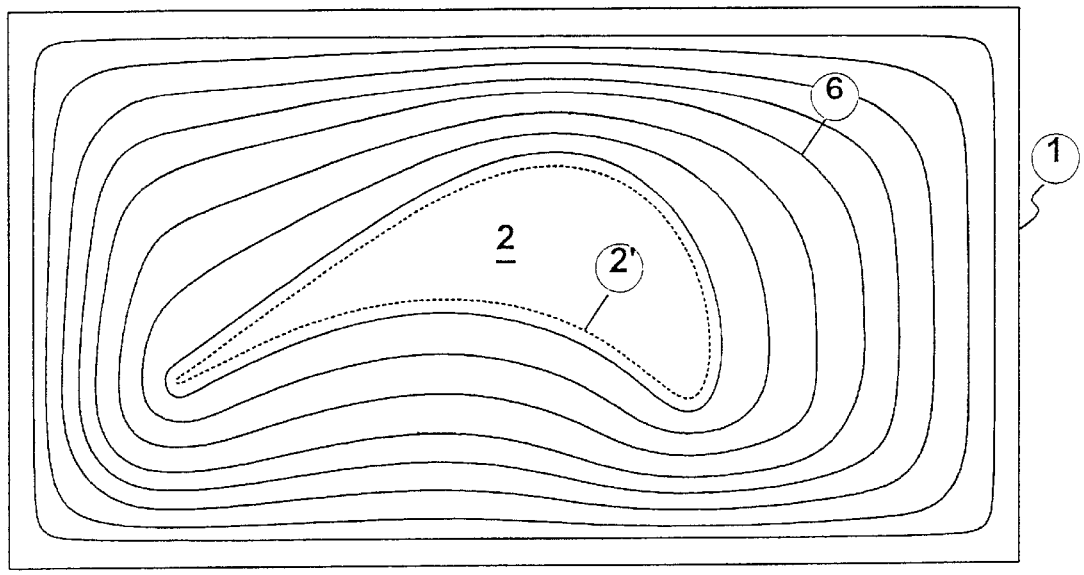
FIG. 1b: further auxiliary lines for approximation to a spiral, two-dimensional guide path.

FIG. 1b shows the same blank 1 having the profile 2' of the finished turbine blade 2. Again, by analogy with electrostatics, further auxiliary lines 6 are placed between the blade profile and the blank profile. These auxiliary lines 6 correspond to equipotential lines 6, which in each case run perpendicularly to the field lines 3 of FIG. 1a. In accordance with their potential value, the lines 6 form a harmonic approach from the shape of the blank to the shape of the finished part without abrupt changes in direction along the guide path.

Figure 1C:
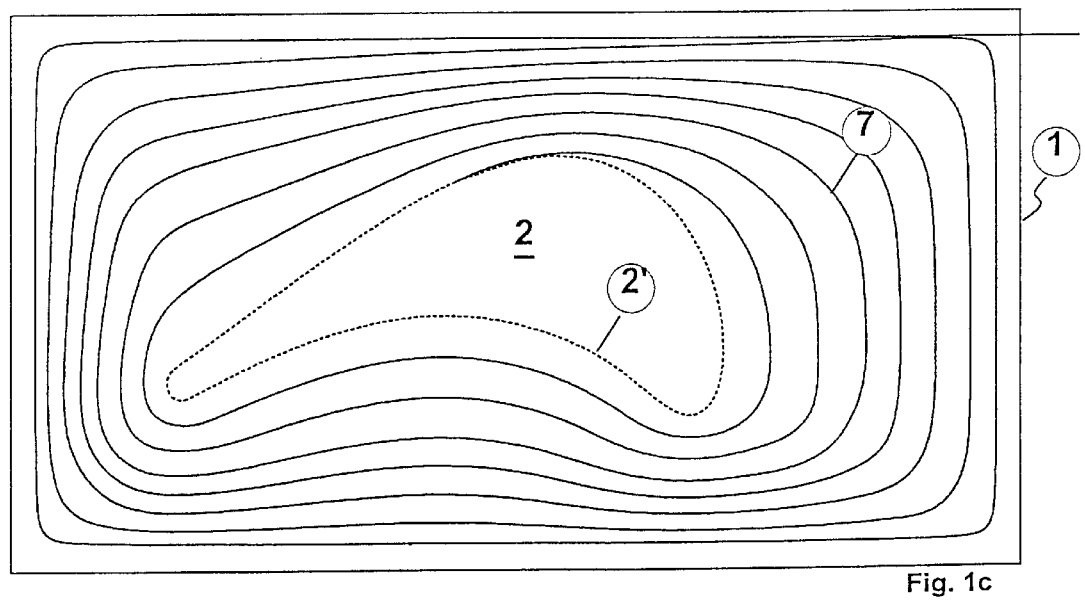
FIG. 1c: a spiral, two-dimensional guide path according to the invention.

A continuous, spiral guide path from the blank to the finished part is now produced by a local change in and connection of the individual equipotential lines, so that the guide path 7, as shown in FIG. 1c, is obtained. It starts on the blank profile and runs continuously around the blade profile 2' to be produced by virtue of the fact that it continuously approaches the desired profile 2' and finally reaches the latter. In the process, it does not pass through the air outside the blank 1. In a variant of this method, the auxiliary lines 3 of FIG. 1b, that is the auxiliary lines 3 similar to electrostatic field lines, are taken as a basis for producing a guide path according to the invention. Instead of the equipotential lines, a well-defined spiral function is produced, and this spiral function, like a continuous variation in the electrostatic potential between the two profile lines, gradually approaches the profile of the finished part from the profile of the blank.

Figure 2A:
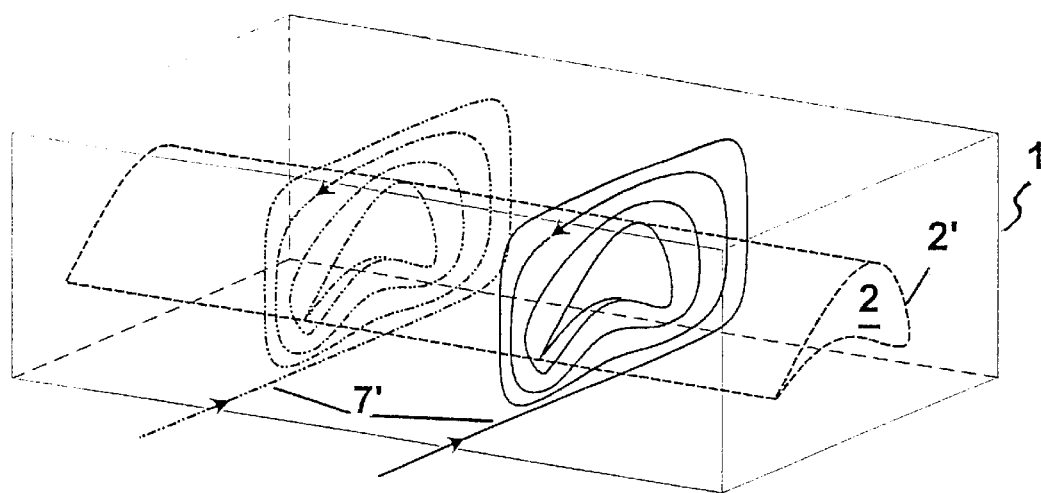
FIGS. 2a, b and c, in a three-dimensional form, each show an outline of a finished turbine blade and a blank with different variants for producing spiral guide paths according to the invention, of which the following is shown.

The guide paths for the milling method according to the invention can be produced on the three-dimensional workpiece according to different variants. FIG. 2a shows a first variant, in which the two-dimensional guide path 7 of FIG. 1c is used in a repeatedly displaced manner.

When this guide path is followed, the turbine blade is milled slice by slice. In this case, the width of an individual spiral or milled-off slice corresponds to the width of the milling tool. Milling is therefore carried out across this width along a planar, spiral guide path down to the desired profile surface of the finished part. The tool is then lifted and moved to the starting point of the next planar spiral path or slice to be removed. This is repeated until the blade has been milled over its entire length.

A repetition of the same planar spiral curve 7 along the entire length of the turbine blade is shown in FIG. 2a. Planar spiral curves can also be used in the case of twisted turbine blades by the individual, two-dimensional spiral curves being varied along the turbine length.

Figure 2B:
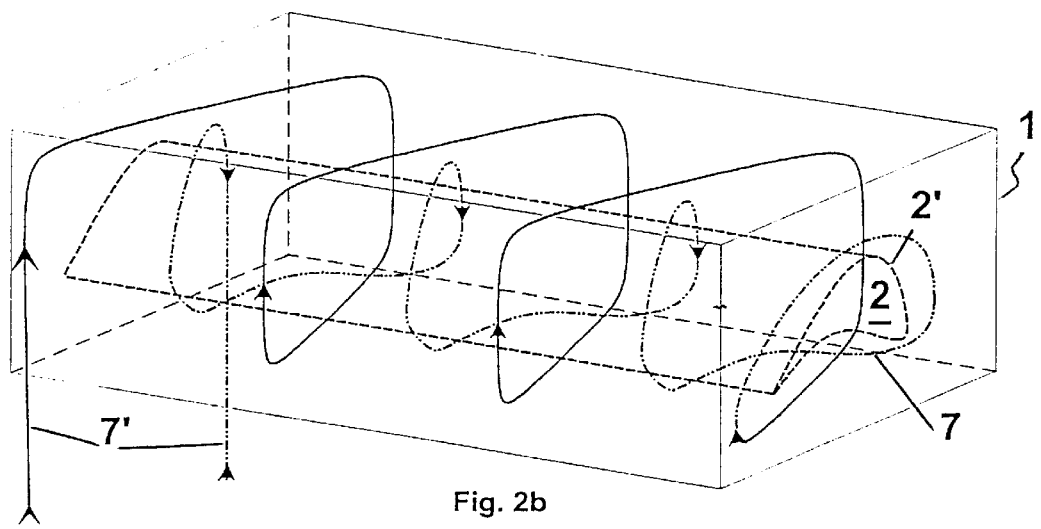
FIG. 2b: a guide path consisting of a three-dimensional spiral (double spiral) in the longitudinal direction of the turbine blade, which after reaching the end of the workpiece in a longitudinal direction runs in the opposite direction.

FIG. 2b shows three-dimensional guide paths 7 which have each been produced as a three-dimensional spiral curve on one of several guide surfaces which lie like equipotential surfaces between the surface of the blank and the surface of the finished part. In the case of a turbine blade, these three-dimensional spiral curves run in a longitudinal direction of the blade. At the end of the spiral curve 7' in a longitudinal direction, the underlying equipotential surface is reached in a planar spiral curve 7. The next spiral curve 7' now runs in the opposite direction. A double spiral is thus formed. During the milling, the spiral curves are in each case covered in alternating directions through the use of down-cut milling and up-cut milling, as a result of which uninterrupted material removal is achieved.

Figure 2C:
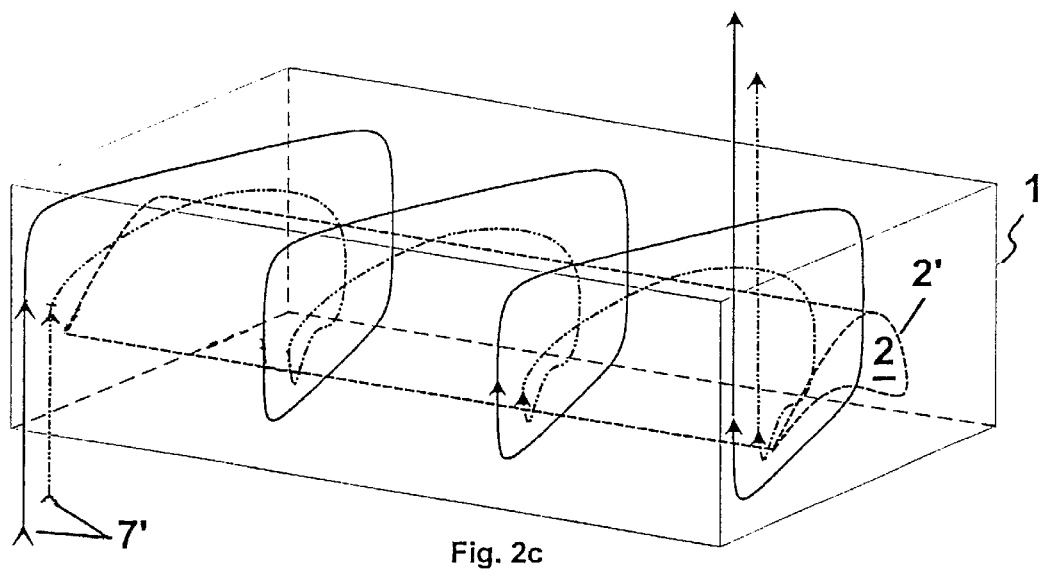
FIG. 2c: a guide path consisting of a recurring three-dimensional spiral in a longitudinal direction of the turbine blade, which always runs in the same longitudinal direction of the blade.

FIG. 2c represents a further variant, in which the three-dimensional spiral curves 7' run in a longitudinal direction, the direction of all the spiral curves being the same. During the milling, the milling tool is guided along a spiral curve in this direction, in which case, after reaching the end of this spiral curve 7', the tool is lifted and brought back in the air to the starting point and guided further along the next spiral curve on the next, deeper-set equipotential surface.

After the guide path has been calculated, the orientation of the tool axis has to be established. In the case of the two-dimensional machining, this is done by the cross product of the tangent vector at the spiral curve of the respectively determined point of contact and the normal vector of the machining plane. The tool axis is then inclined by a plunge angle in the feed direction relative to the vector from this cross product.

In the three-dimensional case, the orientation of the tool axis is effected by the normal vector of the equipotential surface at the point of contact. The tool axis is then inclined by a plunge angle in the feed direction relative to this normal vector, in the course of which it may additionally be tilted sideways.

Figure 3:
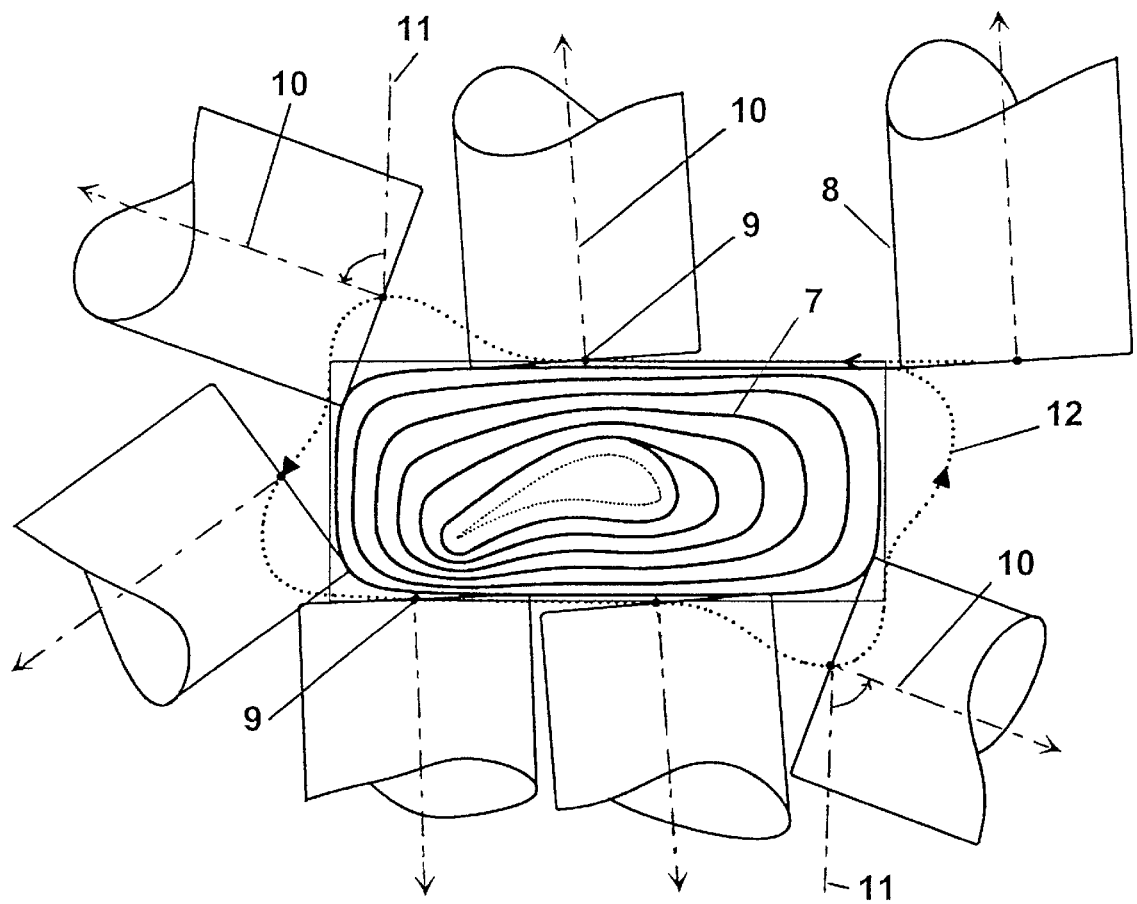
FIG. 3 shows a representation of a milling tool on a guide path according to the invention and the resulting milling path.

Shown in FIG. 3 is a milling tool 8 as used in the milling method according to the invention. For the sake of clarity, only one orbit in one plane of the workpiece is shown. The tool is applied to the workpiece at the point of contact 9 and is moved along the guide path 7. During the milling, the tool axis 10 can be inclined by a plunge angle from the normal vector 11 at the point of contact 9 forward in the direction of the guide path 7 and can also be tilted by an angle of inclination from the normal vector 11 sideways from the plane of the figure. On account of this inclination and the tilting, a resulting milling path 12 (indicated by a dotted line) which differs from the guide path 7 is obtained.

The slice-by-slice machining by means of two-dimensional guide paths according to the first variant of FIG. 2a is effected along a milling path determined by four axes and can be carried out with a machine having three linear axes and one rotation axis. The three-dimensional machining according to the second and third variants requires a machine having three linear axes and two rotation axes. Depending on the type of kinematics of the milling machine, either the milling tool is guided around the blank, the blank is rotated on a rotation axis under the milling tool or milling is carried out by a combination of these two possibilities.

The method according to the invention can be used as it were for roughing and finishing. Thanks to the smooth milling path, the method permits high speed cutting for the finishing. In this case, the resulting volume of removal per unit of time is greater, since the milling method according to the invention is quicker and more efficient due to the continuous material removal.

What is claimed is:

1. A milling method for producing a finished part from a blank utilizing a milling tool wherein:

first of all, auxiliary lines are produced, and these first auxiliary lines run like electrostatic field lines between a profile of the finished part and a profile of the blank;

then, a spiral guide path is produced dependent upon these electrostatic field lines, and this spiral guide path starts at the profile of the blank like a continuous variation of the electrostatic potential between the profile of the blank and the profile of the finished part and runs continuously and spirally around the finished part until the profile of the finished part is reached;

and finally, moving said milling tool along said spiral guide path.

2. The milling method as claimed in claim 1, wherein the continuous path is designed as a two-dimensional, planar, spiral guide path or as a three-dimensional, spiral guide path.

3. The milling method as claimed in claim 2, wherein the milling tool is continuously guided along a first two-dimensional, spiral guide path between a profile line of the blank and a profile line of the finished part and as a result a slice of material is continuously removed, the milling tool is then brought back again to the profile line of the blank, is displaced along a longitudinal axis of the finished part, and a slice of material is again continuously removed along a further spiral, two-dimensional guide path down to the profile line of the finished part, and wherein the above steps are repeated until the entire length of the finished part has been milled.

4. The milling method as claimed in claim 3, wherein the two-dimensional, spiral guide paths covered along the longitudinal axis of the finished part are in each case the same size and shape.

5. The milling method as claimed in claim 3, wherein the two-dimensional, spiral guide paths covered along the longitudinal axis of the finished part are in each case different.

6. The milling method as claimed in claim 2, wherein the milling tool is guided along a first three-dimensional, spiral guide path in a longitudinal direction of the finished part and, after reaching the end of the finished part, is lifted from the latter and is moved through the air to the start of a next deeper-set three-dimensional, spiral guide path and moved along this guide path, and wherein the above steps are repeated until a profile of the finished part has been reached.

7. The milling method as claimed in claim 2, wherein the milling tool is moved along a first three-dimensional, spiral guide path in a longitudinal direction of the finished part and, after reaching the end of the finished part, is moved along a two-dimensional, spiral guide path to a next deeper-set three-dimensional, spiral guide path and is then moved along this three-dimensional guide path in the opposite longitudinal direction, and wherein the above steps are repeated until a profile of the finished part has been reached.

8. The method of producing a continuous, two-dimensional, spiral guide path as claimed in claim 2, wherein further auxiliary lines are produced, and these further auxiliary lines run around the finished part like electrostatic equipotential lines, and a connection between the individual equipotential lines is formed by a local change in the equipotential lines, and the equipotential lines connected to one another result in the spiral guide path.

9. The milling method as claimed in claim 1, wherein the entire milling method from the blank to the finished part is effected in a single set-up.

10. The milling method as claimed in claim 1, wherein a ceramic milling tool is used for the milling method.

11. The use of the milling method as claimed in claim 1 for producing turbine blades wherein the milling is performed along five axes including three linear axes and two rotational axes.

12. The milling method as claimed in claim 1, wherein, during the milling, the tool is first applied to the blank at a point of contact along the guide path wherein a longitudinal axis of the tool is normal to the surface of the blank at the point of contact, is then tilted in the direction of the guide path by a plunge angle, and then the tilted tool is then moved along the guide path creating a milling path, the milling path differing from the guide path because of the tilting.

13. A milling method for producing any desired finished part from any desired blank by means of a milling tool, wherein the milling tool is guided along a continuous guide path from an outer contour of the blank to a contour of the finished part and a continuous change of form from the blank to the finished part is achieved with continuous material removal, wherein the milling tool is moved along a first three-dimensional, spiral guide path in a longitudinal direction of the finished part and, after reaching the end of the finished part, is moved along a two-dimensional, spiral guide path to a next deeper-set three-dimensional, spiral guide path and is then moved along this three-dimensional guide path in the opposite longitudinal direction, and wherein the above steps are repeated until a profile of the finished part has been reached.

14. A milling method for producing a finished part from a blank utilizing a milling tool, comprising the steps of:

producing auxiliary lines, said auxiliary lines running around the finished part like electrostatic equipotential lines;

producing a spiral guide path dependent upon said electrostatic equipotential lines, said spiral guide path starting at the profile of the blank like a continuous variation of the electrostatic equipotential lines between the profile of the blank and the profile of the finished part and running continuously and spirally around the finished part until the profile of the finished part is reached;

moving said milling tool along said spiral guide path so that the blank is roughened down to a shape of the finished part wherein a shape of the blank is distinct from the shape of the finished part, the blank continuously changing form from the blank to the finished part by continuously removing material.

* * * * *